US008566032B2

United States Patent
Chowdhary et al.

(10) Patent No.: US 8,566,032 B2
(45) Date of Patent: Oct. 22, 2013

(54) METHODS AND APPLICATIONS FOR ALTITUDE MEASUREMENT AND FUSION OF USER CONTEXT DETECTION WITH ELEVATION MOTION FOR PERSONAL NAVIGATION SYSTEMS

(75) Inventors: Mahesh Chowdhary, San Jose, CA (US); Arun Kumar, Delhi (IN); Manish Sharma, Noida (IN); Ashutosh Pande, Noida (IN); Mahaveer Jain, Rajastrian (IN); Gagan Narula, Gwaziabad (IN); Chinmay Agarwal, Uttar Pradesh (IN); Kolin Paul, Delhi (IN)

(73) Assignee: CSR Technology Holdings Inc., San Jose, CA (US)

( * ) Notice: Subject to any disclaimer, the term of this patent is extended or adjusted under 35 U.S.C. 154(b) by 775 days.

(21) Appl. No.: 12/609,582

(22) Filed: Oct. 30, 2009

(65) Prior Publication Data

US 2011/0106449 A1    May 5, 2011

(51) Int. Cl.
*G01C 21/00* (2006.01)
(52) U.S. Cl.
USPC ............ 701/469; 701/495; 701/121; 701/480
(58) Field of Classification Search
USPC .................................................. 701/214, 121
See application file for complete search history.

(56) References Cited

U.S. PATENT DOCUMENTS

| | | | |
|---|---|---|---|
| 4,127,249 A | 11/1978 | Lambregts | |
| 4,321,678 A | 3/1982 | Krogmann | |
| 5,422,817 A | 6/1995 | Tazates et al. | |
| 5,878,357 A | 3/1999 | Sivashankar et al. | |
| 5,890,093 A | 3/1999 | Mark et al. | |
| 5,928,309 A | 7/1999 | Korver et al. | |
| 6,097,337 A | 8/2000 | Bisio | |
| 6,151,551 A | 11/2000 | Geier et al. | |
| 6,282,496 B1 | 8/2001 | Chowdhary | |
| 6,285,954 B1 | 9/2001 | Mark et al. | |
| 6,446,005 B1 | 9/2002 | Bingerman et al. | |
| 6,532,419 B1 | 3/2003 | Begin et al. | |

(Continued)

FOREIGN PATENT DOCUMENTS

| | | |
|---|---|---|
| EP | 2072949 | 11/2009 |
| JP | 2005069841 | 3/2005 |

(Continued)

OTHER PUBLICATIONS

Search Report issued Feb. 25, 2011 in corresponding UK matter.

(Continued)

*Primary Examiner* — Thomas Tarcza
*Assistant Examiner* — Maceeh Anwari
(74) *Attorney, Agent, or Firm* — Pillsbury Winthrop Shaw Pittman LLP

(57) ABSTRACT

Methods and apparatuses for estimating a user's altitude with respect to the mean sea level are provided. According to some aspects, the present invention is able to estimate altitude in both open sky as well as in degraded GPS signal environments such as dense urban canyon environments where GPS performance is affected by fewer available satellites and/or multipath error. According to other aspects, the present invention uses data from a pressure sensor to estimate altitude, either with or without the use of GPS aiding data. According to further aspects, estimated altitude is integrated with other types of dead reckoning data to provide user context detection pertaining to changes of altitude.

24 Claims, 4 Drawing Sheets

(56) References Cited

U.S. PATENT DOCUMENTS

| | | |
|---|---|---|
| 6,622,091 B2 | 9/2003 | Permutter et al. |
| 6,647,352 B1 | 11/2003 | Horton |
| 6,782,315 B2 | 8/2004 | Lu |
| 6,801,855 B1 | 10/2004 | Walters et al. |
| 6,915,205 B2 | 7/2005 | Kim et al. |
| 6,931,322 B2 | 8/2005 | Jung et al. |
| 7,035,733 B1 | 4/2006 | Alwar |
| 7,124,026 B2 | 10/2006 | Hong |
| 7,248,964 B2 * | 7/2007 | Bye ............................. 701/469 |
| 7,286,933 B2 | 10/2007 | Cho |
| 7,337,650 B1 | 3/2008 | Preston et al. |
| 7,392,116 B2 | 6/2008 | Kesselgruber |
| 7,430,367 B2 | 9/2008 | Imada |
| 7,437,230 B2 | 10/2008 | McClure et al. |
| 2002/0022924 A1 | 2/2002 | Begin |
| 2002/0032539 A1 | 3/2002 | Tsuji et al. |
| 2004/0027278 A1 | 2/2004 | Park |
| 2004/0036650 A1 | 2/2004 | Morgan |
| 2004/0044477 A1 | 3/2004 | Jung et al. |
| 2004/0181335 A1 | 9/2004 | Kim et al. |
| 2005/0137800 A1 | 6/2005 | Hong |
| 2006/0100781 A1 | 5/2006 | Lin et al. |
| 2006/0100782 A1 * | 5/2006 | Levi et al. ..................... 701/217 |
| 2006/0165398 A1 | 7/2006 | Imada |
| 2007/0168124 A1 | 7/2007 | Dossas et al. |

FOREIGN PATENT DOCUMENTS

| | | |
|---|---|---|
| WO | WO 00/17601 | 3/2000 |
| WO | WO 02/018873 | 7/2002 |
| WO | WO 2007/059134 | 5/2007 |

OTHER PUBLICATIONS

Baar-Itzhack, et al., "Attitude Determination for Vector Observations: Quaternion Estimation", IEEE Transactions on Aerospace and Electronic Systems', (1985), v. AES-21(1), pp. 128-136.

Goa, et al, "Quaternion Based Kalman Filter for Micro Machined Strapdown Altitude Heading Reference System", Chinese Journal of Aeronautics, Aug. 2002, vol. 15(3), pp. 171-175.

Creamer, G., "Spacecraft Attitude Determination using Gyros and Quaternion Measurements", Journal of the Astronautical Sciences, (1996), vol. 44(3), pp. 357-371.

Leffers, E.J., et al., "Kalman Filtering for Spacecraft Attitude Estimation", Journal of Guidance, Control and Dynamics, (1982), vol. 5(5), pp. 417-429.

* cited by examiner

METHODS AND APPLICATIONS FOR ALTITUDE MEASUREMENT AND FUSION OF USER CONTEXT DETECTION WITH ELEVATION MOTION FOR PERSONAL NAVIGATION SYSTEMS

FIELD OF THE INVENTION

The present invention is related to location positioning systems, and more particularly, to a method and apparatus of detecting and estimating altitude and/or elevation motion and using such information in detecting motion modes and user context in a mobile device.

BACKGROUND OF THE INVENTION

With the development of radio and space technologies, several satellite based navigation systems (i.e. satellite positioning system or "SPS") have already been built and more will be in use in the near future. SPS receivers, such as, for example, receivers using the Global Positioning System ("GPS", also known as NAVSTAR, have become commonplace. Other examples of SPS systems include, but are not limited to, the United State ("U.S.") Navy Navigation Satellite System ("NNSS") (also known as TRANSIT), NAVSTAR, the Russian counterpart to NAVSTAR known as the Global Navigation Satellite System ("GLONASS") and any future Western European SPS such as the proposed "Galileo" program. As an example, the U.S. NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time (i.e. navigation solution).

GPS and other satellite based navigational systems have some limitations such as the availability of a sufficient number of satellite signals. Satellite signals are sometimes not available in deep canyons, in areas with large number of buildings blocking the direct satellite signals, and in dense forest areas. In addition to this, the satellite signals can be completely blocked or greatly attenuated inside buildings. To reduce these errors, inertial measurement units (IMUs) equipped with microelectromechanical systems (MEMS) sensors can be integrated with a personal navigation device (PND) to provide data that is used to improve the position availability and reliability of the PND in degraded signal environments. For example, in an indoor environment where satellite signals are not available or a dense urban environment where multipath errors are common, MEMS sensor data can aid in the calculation of a navigation solution. IMUs include gyroscopes that measure changes in direction, accelerometers that estimate acceleration, magnetic sensors that can detect changes in the orientation of a device, and a host of other similar devices.

More particularly, after the position of a PND is initially determined, the IMUs allow the position of the PND to be determined as the PND moves, even if the satellite signals are blocked. The determination of a position by propagating a previous known position based on movement data (e.g., data provided by an IMU) is known as dead reckoning (DR), or inertial navigation. Currently, DR methods do not take into account how the PND is moving other than detecting changes in velocity, acceleration or heading.

Co-pending application Ser. No. 12/510,965, the contents of which are incorporated herein in their entirety, greatly advanced the state of the art by disclosing a method and apparatus of detecting and using motion modes in a mobile device. According to one aspect of the co-pending application, movement data is collected from an inertial measurement unit (IMU) of the mobile device and compared to two or more sets of training data, each set of training data corresponding to a different motion mode. Then, a motion mode is determined to be the current mode of the mobile device on the results of the comparison.

Nevertheless, some challenges remain. For example, altitude estimates using GPS measurements generally have a significant error, such that it is not possible to accurately determine the floor of a building the user is in or to detect the context in which the user is moving vertically (e.g. in an elevator/on an escalator). Meanwhile, it is important to obtain knowledge of the height of the floor the user is currently on, inside buildings. This information could be useful, for example, for location based services such as finding a store in a multi-level shopping mall. Moreover, it would be helpful to know whether the user is traveling inside an elevator or is possibly changing floors using a stairwell/ramp. Accordingly, it would be useful to integrate altitude measurements into a position estimation framework using DR as well as in a comprehensive User Context Detection scheme such as that shown in the co-pending application.

SUMMARY OF THE INVENTION

The present invention provides methods and apparatuses for estimating a user's altitude with respect to the mean sea level. According to some aspects, the present invention is able to estimate altitude in both open sky as well as in degraded GPS signal environments such as dense urban canyon environments where GPS performance is affected by the number of available satellites and/or multipath errors. According to other aspects, the present invention uses data from a pressure sensor to estimate altitude, either with or without the use of GPS aiding data. According to further aspects, estimated altitude is integrated with other types of dead reckoning data to provide user context detection pertaining to changes of altitude.

According to these and other aspects, a method according to embodiments of the invention includes receiving information corresponding to a user's position in altitude and automatically determining the user's context based on the received information, the context including whether or not the user's altitude is changing, and if it is changing, a type of motion associated with the changing altitude, such as moving on a ramp, escalator, staircase or elevator. In additional furtherance of these and other aspects, in embodiments the received information is from a pressure sensor. In yet additional furtherance of these and other aspects, in embodiments the method includes receiving additional information from an external source such as atmospheric conditions, and using the additional information to augment the pressure sensor information and/or calibrate the pressure sensor.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting, rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
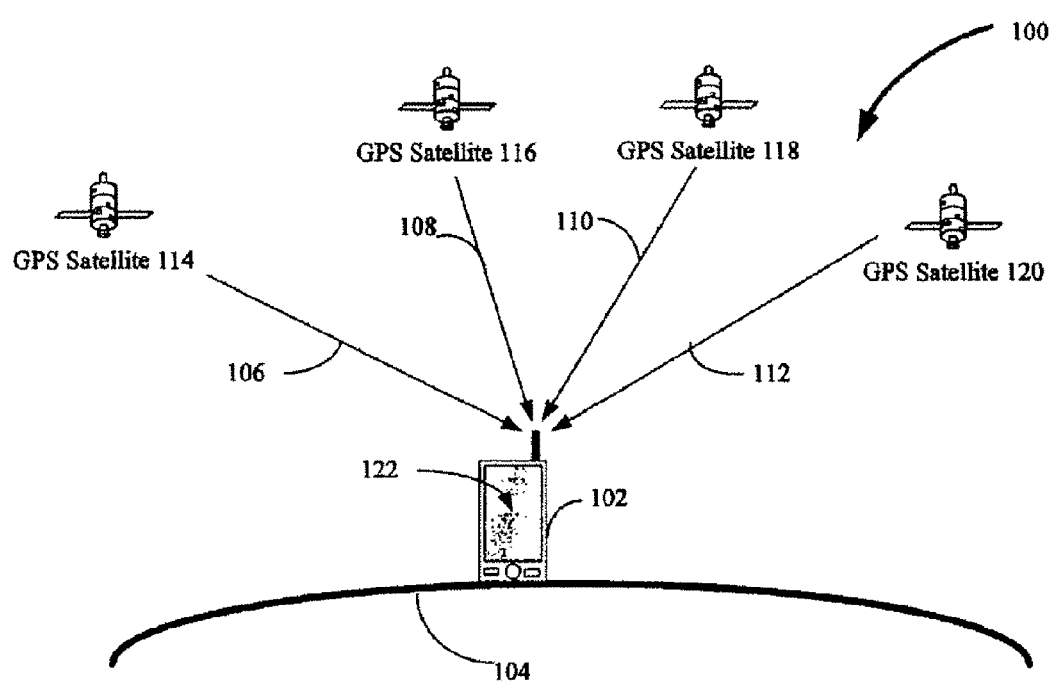
FIG. 1 is a block diagram of an example implementation of principles of the invention.

FIG. 1 illustrates an example implementation of embodiments of the invention. As shown in FIG. 1, GPS satellites (i.e. SVs) 114, 116, 118 and 120 broadcast signals 106, 108, 110 and 112, respectively, that are received by GPS device 102, which is located at a user position somewhere relatively near the surface 104 of earth.

GPS device 102 can be a handheld/portable personal navigation device (PND, e.g., PNDs available from Gamin, TomTom, etc.) or a cell phone, iPhone, PDA, handheld or laptop computer, or other type of device with built-in GPS functionality, or any GPS device embedded in tracking applications (e.g., automotive tracking from Trimble, package or fleet management tracking from FedEx, child locator tracking applications, etc.). Such GPS functionality can be implemented by chipsets such as SiRFStar and other chipsets from SiRF Technology, Inc., for example, which include core processors and embedded storage and software for processing received GPS/SPS signals and/or determining a navigation solution based on the received and processed signals.

As will become more apparent from the descriptions below, GPS device 102 according to aspects of the invention also includes sensors such as accelerometers, pressure sensors, gyroscopes and the like (collectively, inertial measurement unit or IMU). GPS device 102 also includes DR functionality, as adapted with the functionality of the present invention. Example sensors and functionality that can be adapted for use in the present invention are described in more detail in U.S. patent applications Nos. 11/823,964 and 12/471,147, commonly owned by the present assignee, the contents of which are incorporated by reference herein in their entirety. Those skilled in the art will be able to understand how to adapt the apparatuses and functionality depicted in those applications for use with the techniques of the present invention after being taught by the descriptions herein, and so further details thereof will be omitted here for sake of clarity of the invention.

Signals 106, 108, 110 and 112 are well-known GPS signals in which three binary codes shift the satellite's transmitted L1 and/or L2 frequency carrier phase. As is known, signals from at least four SVs are usually needed before device 102 can provide a 3-dimensional navigation solution (only three satellites are required for a 2-dimensional navigation solution; e.g., by using known altitude).

According to one aspect of the invention mentioned above, methods and apparatuses are included in device 102 to estimate altitude and detect motion/user context of the PND device based on data from an IMU of, or in communication with, the PND device. A motion mode is also preferably determined which indicates how the PND device is moving. Since a PND is typically carried by a human user, examples of motion modes (e.g. for use in pedestrian DR) include: on a particular floor, walking up or down the stair case/ramp, or going up and down in an elevator/escalator, etc.

Before explaining in further detail how the invention estimates altitude, some background is provided. A known technique for estimating altitude is atmospheric pressure measurement. This technique is based on the fact that atmospheric pressure varies linearly in an inverse relation with altitude and by measuring the pressure, a good estimate of altitude can be obtained. The inverse linear relation of atmospheric pressure to altitude is valid for the distance from Earth's surface to troposphere (approximately 10 kilometers above Earth's surface).

Absolute altitude can be calculated using the following formula $$\text{Altitude} = 44330 * \left(1 - \left(\frac{p}{p_0}\right)^{\frac{1}{5.255}}\right)$$

where p—is the pressure measurement, and $p_0$—is pressure at mean sea level (1013.25 hPa). However, atmospheric pressure changes due to daily weather patterns. Hence, altitude estimated by pressure sensor needs to be calibrated periodically. The present disclosure thus also includes methods for calibrating a pressure sensor.

Relatedly, dead reckoning (DR) methods can determine a user's position by propagating the previous known position from various MEMS inertial and magnetic sensors when the GPS signal is degraded or not available. Determination of the user's local or global coordinates requires input estimates of the horizontal x, and y and the vertical z coordinates as well as the attitude (i.e. orientation with respect to trajectory of motion). As set forth in the co-pending application, the x and y coordinates can be estimated by applying certain stride length estimation algorithms and combining these with heading and inclination angles obtained from magnetometers and gyroscopes. However, the present inventors recognize that the problem of accurately determining the z coordinate persists. For example, the accelerometer z axis does not provide relevant information regarding height and therefore, cannot be used as a viable source.

Moreover, GPS altitude measurements have been shown to be very noisy and inaccurate especially in environments where the GPS signal is obstructed by physical barriers which are a particularly acute and permanent problem for indoor navigation. The present inventors have determined that the integration of altimeter or barometer with GPS is a feasible option for altitude estimates. For this purpose, the following descriptions will detail the use of an Altimeter (e.g. Pressure sensor or barometer) in altitude estimation algorithms.

In addition to estimating an instantaneous altitude, the present inventors recognize that the use of a position tracking, contextually aware device inside labyrinthine office buildings and large commercial complexes such as indoor malls, cinemas and hotels/resorts etc. entails an ability to recognize which floor or at what height the user/device is at any point of time. For example, assume that a user enters a mall and needs to be directed to a particular store. Further assume that the cellular service provider has a plan where the store coordinates and current offers/schemes are automatically updated in the mobile handset containing our device. The device can then keep a track of its on position and current orientation with respect to the actual location of the shop. This will utilize altitude information.

Also, the cases of a user moving in an elevator and climbing up or descending staircases or ramps can only be recognized if pressure sensor data is correctly incorporated into User Context Detection algorithm(s) such as those described in detail in the co-pending application.

Accordingly, the text below describes an application and method for augmenting the altitude information available from GPS with altitude sensors (e.g. MEMS pressure sensors) for use in pedestrian and other navigation devices, as well as a method for detecting the state of the user moving in altitude, such as from one floor to another. The present algorithms thereby augment indoor navigation algorithms designed to work in 2D plane to work in 3D space. The present inventors recognize that a high sensitivity GPS receiver such as SiRFstarIII, adapted with the methods and apparatuses of the present invention, would be able to compute user altitude with a good degree of reliability and accuracy for most environments.

In general, the invention integrates MEMS pressure sensors and additional altitude estimation and motion functionality with the GPS functionality of device 102 to improve altitude availability and reliability in GPS degraded or denied signal environments. Indoor environments where GPS signals are not available or dense urban environments where GPS performance is affected by multipath error and/or insufficient GPS satellite signals are examples of where MEMS sensor based positioning can aid GPS position computation.

It should be noted that many commercially available pressure sensors have a good transient response and can detect changes instantaneously but cannot estimate very accurately the absolute value of altitude. So their characteristics are complementary to those of GPS and thus can be combined with the GPS for better altitude estimation.

Moreover, pressure sensor performance can vary greatly based on surrounding conditions, because variations in atmospheric pressure can occur within a particular environment or even a given place. There may even be continuous ambient pressure changes over a period of minutes or several hours due to variation in atmospheric conditions, something the pressure sensor may wrongly infer as continuous changes in altitude due to motion. It has also been observed that, particularly in a closed volume such as a car or a room, the switching on or off of the air conditioning or the opening and closing of a door can also cause observable pressure transients. Some of these are predictable and hence correctable. Accordingly, embodiments of the present invention further provides techniques aimed at correcting the pressure variation due to the following: (i) Altitude above Mean Sea Level; and (ii) Weather patterns, for example.

Figure 2:
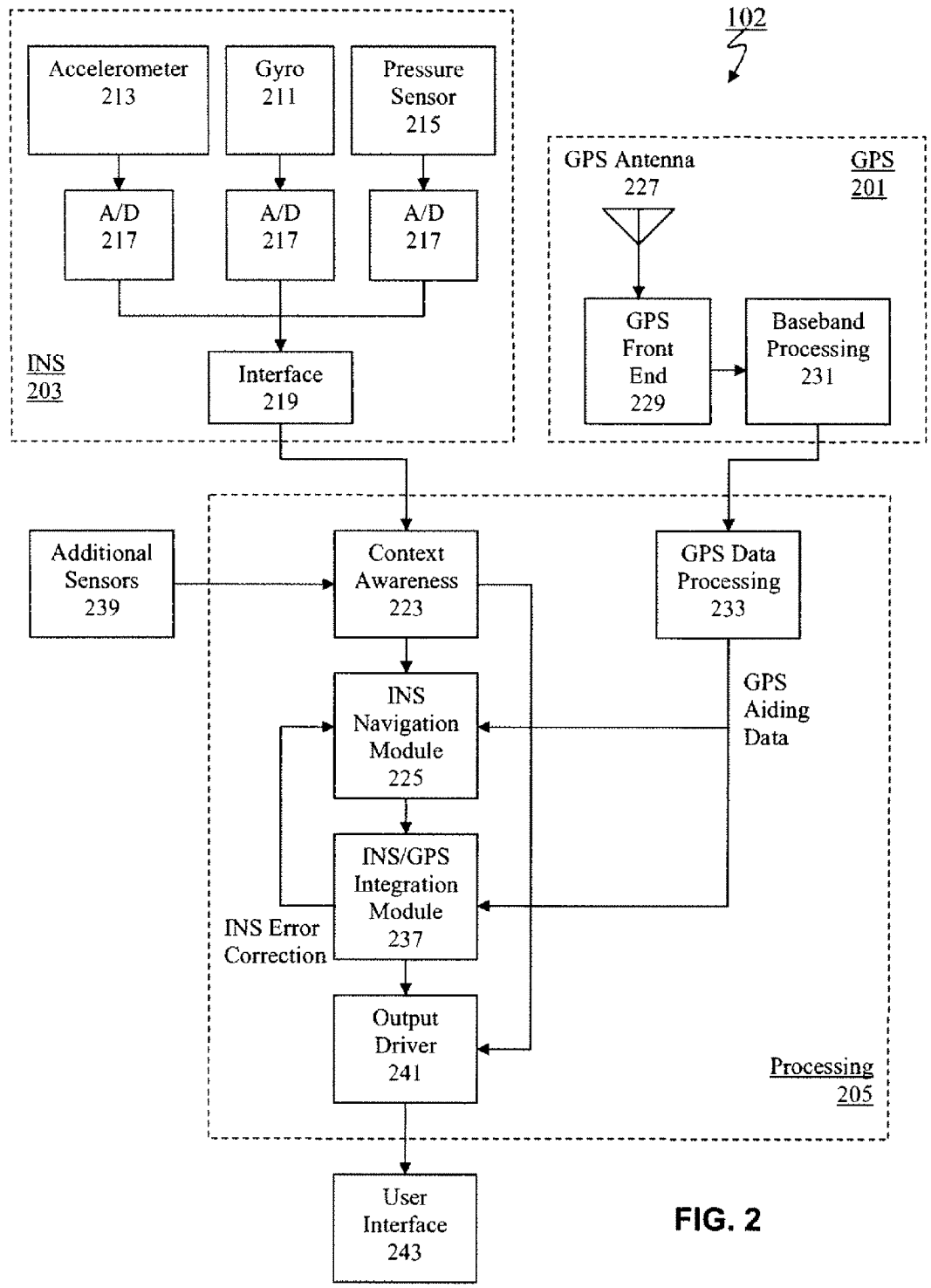
FIG. 2 is a block diagram illustrating an exemplary device incorporating the altitude estimation and context detection functionalities according to an embodiment of the invention.

FIG. 2 provides an example functional block diagram of a device 102 suitable for use with the altitude measurement and motion context techniques of the invention, such as those mentioned above and to be described in more detail below.

In the example of FIG. 2, device 102 includes a GPS subsystem 201, an INS (Inertial Navigation System) subsystem 203, and a signal processing subsystem 205. It can also obtain other external measurement references such as odometer and magnetic (e.g. compass) sensor data 239.

The INS subsystem 203 includes gyroscope sensor(s) 211, accelerometer sensor(s) 213 and pressure sensor(s) 215. The gyroscopes and accelerometers can provide incomplete inertial signals. For example, gyroscope sensor 211 can be a MEMS type inertial sensor (e.g. a commercially available miniature gyro sensor from Epson Toyocom) that only produces a heading signal. Likewise, accelerometer sensor(s) 213 can provide signals for only two dimensions. Pressure sensor(s) 215 can be implemented by commercially available sensors such as a SMD500 manufactured by Bosch Sensortec. It should be appreciated that INS subsystem 203 need not include all types of sensors 211, 213 and 215, but can include any one or more of sensors 211, 213 or 215.

In any event, the measurements from sensors 211, 213 and 215 are first applied to respective digital to analog converters 217. The digital signals are then applied to an interface 219 that allows the digital signals to be presented to the system processor 205 in the format and timing (e.g. sampling rate) that is appropriate for the system. Properly interfaced, the digital signals are then sent to a context awareness module 223. This module makes use of the signals from INS 203 to estimate altitude, motion and/or motion context of the user, as will be described in more detail below. The altitude, motion and/or context information is provided to INS navigation module 225. It should be noted that in other embodiments, some or all of the information from INS 203 can also be provided directly to module 225 rather than through module 223.

As can be appreciated by those skilled in the art, the inertial navigation system 225, given an accurate initial position, maintains an accurate position for the navigation device as the vehicle moves. The accuracy of the positioning will depend upon the accuracy of the sensors. In commercial aviation applications, for example, an accurate position fix can be maintained over hundreds of miles. Any sensor errors accumulate over time, so that the accuracy of the position degrades with time and distance. With low cost MEMS sensors, for example, the error will increase more quickly; however, the INS can be made accurate enough to allow for accurate positioning under bridges, between buildings and through tunnels.

The GPS subsystem 201 can be used for initial position determinations and to correct the position determinations from the INS 203. In the example of FIG. 2, the GPS subsystem, in the form of a GPS receiver 201, has a GPS antenna 227, RF (Radio Frequency) front end 229, and GPS baseband signal processing 231. The antenna receives signals from a constellation of GPS satellites which are down converted in the RF front end and demodulated in the baseband processing.

The received data and timing are sent to a GPS data processing module 233 to determine the position of the navigation device. Other information can also be determined such as the rate of change of position or velocity, absolute time, GPS satellite pseudorange, Doppler frequencies and any other data that might be helpful for a particular embodiment. This data is sent to an INS/GPS integration module 237 where it is used to aid, supplement or replace the position determination from the INS module 225. Using this GPS information, INS errors can be estimated in the INS/GPS integration module 237, and in turn, the INS subsystem provides higher accuracy.

The GPS data is also preferably provided directly to the INS navigation module 225. This allows for the INS navigation module to determine, for example, whether the vehicle is in motion, accurate timing, and other information as described above. The INS navigation module 225 and the INS/GPS integration module 237 are connected together to allow the location determination to be determined iteratively. As described above, corrections from the GPS data can be provided to improve the INS data and the improved INS data can be used to provide a better position fix. While a GPS receiver is shown in FIG. 2, any other positioning system can be used as an alternative or as an addition. The location system can also be part of another device, such as a wireless telephone or tracking device. It should be further apparent that other satellite positioning systems can be used, such as GLONASS.

The determined position and/or motion context is applied from the INS/GPS Integration module to an output driver 241. The output driver can apply the determined position to a stored map, image or any other suitable frame of reference so that the user can understand the position and use the information. The output driver is shown connected to a user interface 243. This can include a display, such as a small touch screen, to show the position and/or context results to the user. There can also be a speaker, a keypad, a microphone, a touch pad and wireless interfaces to other interface devices. The user interface allows the user to determine how the position information is to be displayed. Additional resources (not shown) can be used to determine the position of possible destinations, to compute and display routes, to show surrounding landmarks and to perform any other desired functions to further enhance the usefulness of the position determination.

The modules of the processing section can be implemented as individual ASICs (Application Specific Integrated Circuits), DSPs (Digital Signal Processors) or similar devices, each with their own instruction and operand memory and firmware. Some of the modules can be combined with the illustrated modules or with other modules not shown in a single integrated circuit. Alternatively, a more general purpose controller or processor can be used to perform certain or each of these functions. The controller can include an internal memory for instructions and operands and in addition or instead can have an external memory. The controller can have dedicated circuits for performing the operations of the modules in FIG. 2 or all of these functions can be performed by general purpose circuits. The GPS and INS function blocks can be implemented as a separate GPS chip (e.g. GPS chipsets such as GSD4t/4e, SiRFatlas4 or SiRFprima from SiRF Technologies, Inc.) and a separate INS or IMU chip or chips. Alternatively, they can each be integrated in whole, or in part, with the processing block.

The navigation device 102 is shown as a single system. This type of system is suitable for application to a PND, for example. However, the GPS subsystem and the INS subsystem can be separate and independent from the processing subsystem and from each other. For example, if a vehicle has any integrated sensors, these can be used by the processing subsystem. In addition, particular components, can be provided separately, such as antennas, power supplies, etc. The processing subsystem or the whole device can be provided as a PND, as a navigation component of a smartphone, a PDA (Personal Digital Assistant), or any other portable device.

The approaches described herein are preferably applied to pedestrian use, but can also be used in any type of vehicle, including a bicycle, car, truck, bus or boat by using the PND on the vehicle. It can be used for a wide variety of different navigation devices with differing levels of equipment and complexity. A lesser or more equipped INS, location system, and processing section than the examples described above can be preferred for certain implementations. Therefore, the configuration of the functions and the equipment can vary from implementation to implementation depending upon numerous factors, such as price constraints, performance requirements, technological improvements, or other circumstances. Any one or more of the subsystems, interfaces, or interconnects can be eliminated from this system and others can be added.

One example method of integrating altitude in motion context awareness according to the invention will now be described in connection with FIG. 3. This example method detects the altitude, motion and motion context of the user; i.e. whether she/he is stationary or moving on one floor, moving in an elevator/escalator, walking up or down a ramp/stair and also drift correction indication to update the correct altitude of floor ignoring the effect of the drift of the sensor. However, other types of motion, contexts and applications are within the scope of the invention, and those skilled in the art will be able to understand how to adapt this example for such other applications after being taught by the present disclosure. In one example, the following methodologies can be performed by one or more modules in processing section 205 of device 102 as illustrated above.

Figure 3:
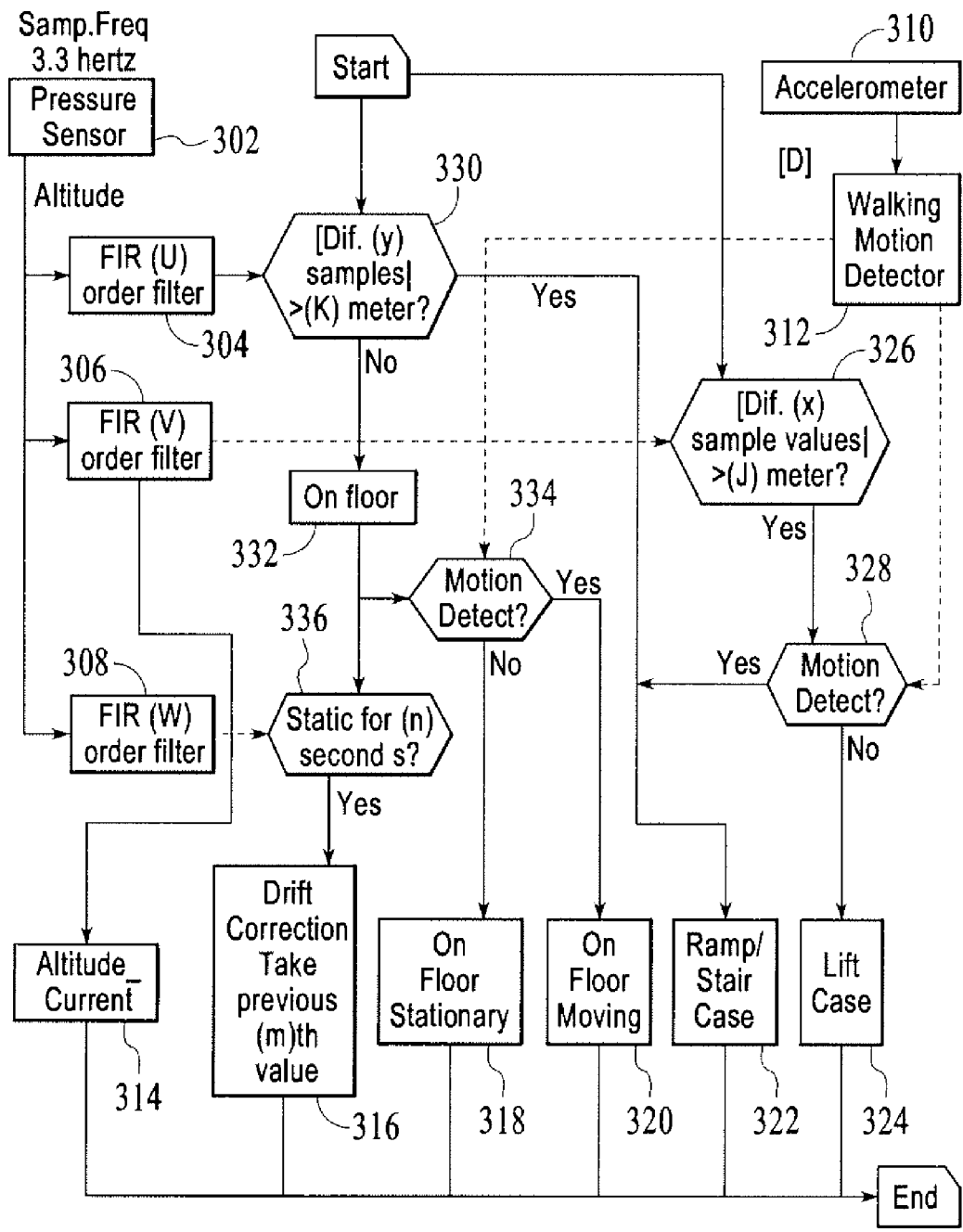
FIG. 3 is a flow diagram illustrating an example methodology for estimating elevation context and other user context modes according to an embodiment of the invention.

As shown in FIG. 3, in 302 the raw data from the pressure sensor (e.g. sensor 215) is sampled at a 3.3 Hz sample rate and converted to pressure values and then to altitude using the above-described exponential function of pressure as well as parameters specific to a sensor. These parameters are provided by a sensor manufacturer.

It should be noted that the detected altitude information is useful by itself in DR algorithms, etc. and/or in combination with GPS altitude as will be described below. However, the invention includes additional methodologies for using the information, and changes thereof, in determining 3-D motion context as described in more detail herein.

The digital altitude samples are then provided to three separate FIR filters, 304, 306, 308. Medium order filter 304 is used to give output in detection of ramp/stair case in which case the context response need not be too fast. A medium order filter will remove a good amount of noise and can be used to detect the ramp/stair case without considerable delay. In one example embodiment, filter 304 is implemented by a uniform FIR filter using a 30 sample window at a sampling rate of 3.3 Hz. Using a threshold of about 1.5 m change within approximately 10 seconds, this filter can sufficiently distinguish a static/on-floor case from a ramp/stair case.

Low order filter 306 is used in detection of elevator case and is also used to supply an instantaneous altitude output 314. The response needs to be fast enough so a low order filter with low noise filtering is used in this case. In one example embodiment, filter 306 is implemented by a sawtooth FIR filter using a 7 sample window at a sampling rate of 3.3 Hz. Using an integration time of about 2 s, this filter can sufficiently detect an elevator case.

High order filter 308 is used in providing a corrected reference output after drift suppression 316, to be described in more detail below. The response need not be fast for this scenario. So a high order filter provides best results. In one example embodiment, filter 308 is implemented by a uniform FIR filter using a 100 sample window at a 3.3 Hz sampling rate. This filter accounts for observed drift on the order of 3 m, corresponding to a floor change, in a duration of a few tens of seconds. Its use in drift correction is described in detail below.

As further shown, accelerometer data (e.g. from accelerometer 213) is also sampled in block 310. This data is used for walking motion detection 312. Walking Motion Detector 312 provides information using accelerometer whether the person is doing any activity similar to walking, as to be described below.

The remaining blocks in FIG. 3 will be described in more detail below in connection with their use in the different motion contexts detected according to this embodiment of the invention.

The following describes steps performed in the Detection of Elevator Case 324. The output of medium order filter 306 is supplied to block 326. This block determines if the difference between some closely spaced filtered altitude values (e.g. 4 samples) is greater than a certain predetermined threshold (e.g. 1 meter). That happens when a person is going up or down one step transition in height. Next, the output of walking motion detector 312 is supplied to block 328. If this block determines that the accelerometer based walking motion detector reports no walking motion, then it is determined that the user is in an elevator use case 324.

The following describes the steps performed in the Detection of Ramp Case 322. The output of low order filter 304 is provided to block 330. This block determines whether the difference between some far apart heavily filtered altitude values (e.g. 100 samples) is greater than a certain predetermined threshold (e.g. 1.5 meters). If so, then it is determined that the user is in transition up/down a ramp or a stair, as reported in block 322. Also, if block 326 determines the difference between some closely spaced filtered values (e.g. 4 samples) is greater than a certain predetermined threshold (e.g. 1 meter), and if block 328 determines that the motion detector reports a walking motion, it is decided that the user is in transition up/down a ramp or stair, as reported in block 322.

The following describes the steps performed in the detection of On the Floor Cases 318 and 320. If block 330 determines that the difference between some far apart heavily filtered altitude values (e.g. 100 samples) is less than a certain predetermined threshold (e.g. 1.5 meters), then it is decided that the user is on a single floor of a building or other location 332. Also if block 334 receives information from the walking motion detector 312 that the user is walking then it is a moving on the floor, as reported in case 320. If block 334 determines that the walking motion detector 312 doesn't report walking then it is determined that the user is stationary on the floor, as reported in case 322.

The following describes the steps performed in Drift Correction 316. Block 336 receives the outputs from high order filter 308 and block 332. Based on the output from block 332, block 336 determines whether the module has been stationary "on floor" for too long (e.g. 100 seconds). If so, then any slow changes in altitude must be reset. The output to be reset is taken from a heavily filtered past (m)th sample value (e.g. m=300) from block 308 and provided in block 316.

Figure 4:
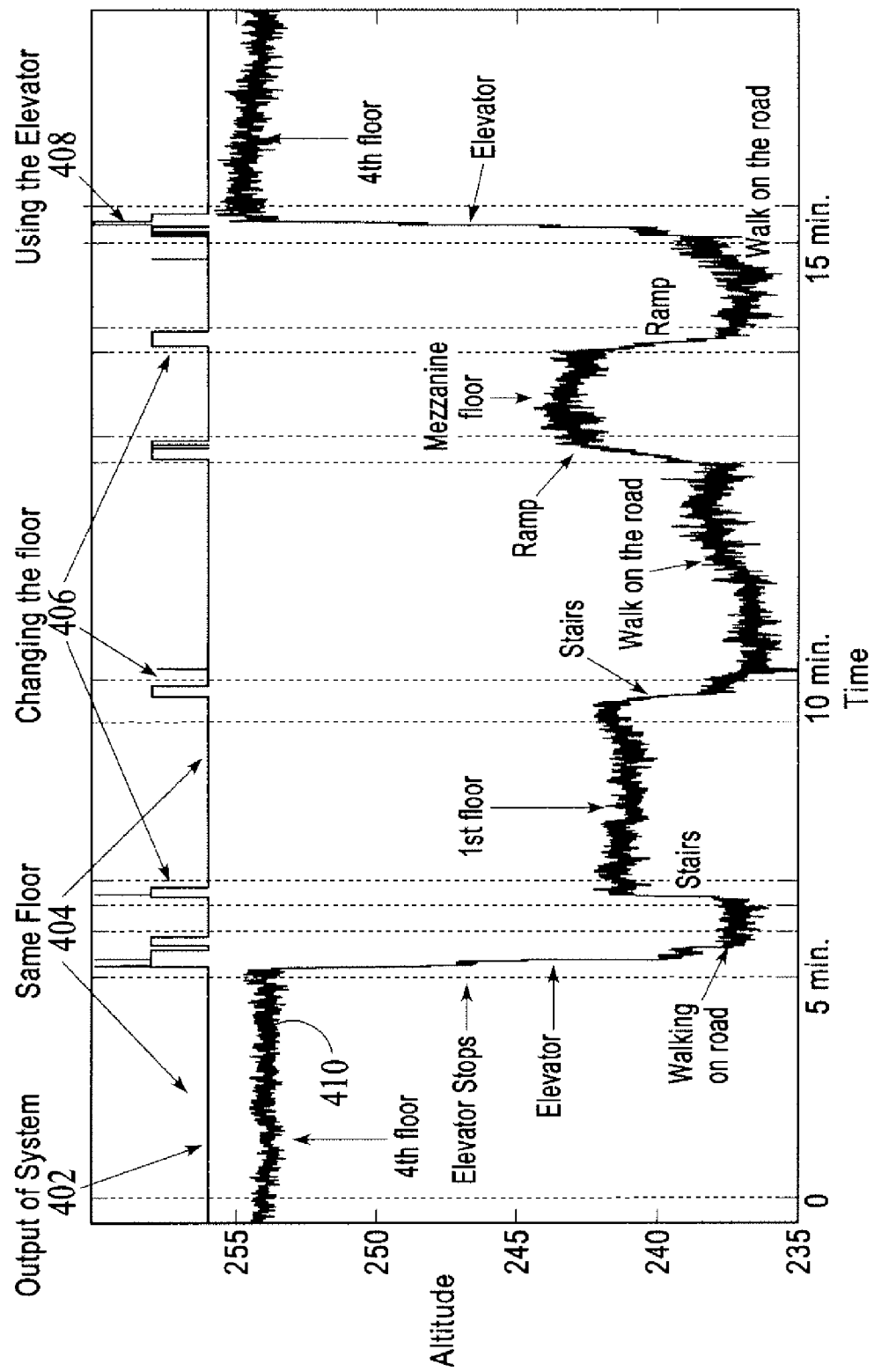
FIG. 4 is a graph illustrating test results of employing the methodologies of the present invention.

FIG. 4 is a graph illustrating actual test results for a typical Use Case scenario using the methodologies described above. In the graph, line 410 shows the actual determined altitude as a function of time, as provided by a pressure sensor and determined using the equations provided above. Line 402 represents the output of the context detection algorithm shown and described above in connection with FIG. 3. Juxtaposed line 410 are labels indicating what actually occurred at given times in the test.

As shown in FIG. 4, line 410 indicates that for about the first 5 minutes, a user was on the $4^{th}$ floor of a building. Accordingly, the output of the system indicates a context of on the same floor 404. After about 5 minutes, the user gets on an elevator, which stops at one or more floors on its way down to street level, after which the user goes to the street. Accordingly, the system indicates a context of using the elevator followed by changing the floor. Next the user walks on the road for about a minute, and the system indicates a context of being on the same floor. The user then walks up stairs to a first floor in a building, and the system indicates a context of changing the floor 406. The user says on the first floor for about 4 minutes, and the system indicates a context of on the same floor 404. Next the user walks down stairs to the road, and the system indicates a context of changing the floor 406. The user then walks on the street for about three minutes, and the street is fairly level. So the system indicates a context of being on the same floor. The user then walks up a ramp to a mezzanine floor about five feet above the street level. So the system indicates a context of changing the floor. The user walks around the mezzanine floor for about a minute, and the system indicates a context of being on the same floor. The user then walks back down to the street, and then walks down the street, so the system indicates a context of changing the floor 406, followed by being on the same floor. The user then takes an elevator to the fourth floor of a building and stays there, with the system indicating a context of using an elevator 408, followed by being on the same floor.

As mentioned above, for a reliable estimate of altitude, the present invention preferably uses altitude estimates both from GPS and from the pressure sensor. The motivation behind this is the complementary nature of the data from both the sensors.

More particularly, the present inventors recognize that altitude data from GPS sometimes has an unrealistic transient response with reference to the pedestrian navigation scenario particularly, for example, at times right after acquiring fixes, when the number of visible satellites is low, and satellite geometry is poor. Accordingly, in some embodiments, a device according to the invention (such as device 102 and processing section 205 in FIG. 2) includes a measurement editing block that removes such erroneous transient values and feeds the complementary Kalman filter (e.g. in INS navigation module 225 and/or INS/GPS integration module 237) with more realistic values. The Kalman filter taking inputs from both the pressure sensor and GPS can provide a better altitude estimate. Its transient response will more or less follow the Pressure Sensor readings and its long term absolute value of altitude will follow GPS measurements. The heuristic drift suppression algorithm described above, specifically made from the pedestrian navigation scenarios, will eliminate the drift in the pressure sensor.

As further mentioned above, for a reliable estimate of altitude, the present invention preferably provides techniques for calibrating the pressure sensor for various scenarios that can lead to inaccurate altitude measurements.

One example method of calibrating the pressure sensor to assist in reliable altitude estimation according to embodiments of the invention will now be described. As mentioned earlier, these embodiments of the invention provide ways to correct for errors which can be induced in a pressure sensor. In some embodiments, this may be performed using connectivity to a server to provide real time as well as historic data to supplement the data from the pressure sensor and/or to use in the altitude calculation and context detection algorithm described above. There are many ways such a client/server architecture can be implemented. For example, if the invention is incorporated in a cellular phone, the phone can communicate with a server provided by the telephone company via the cellular telephone infrastructure. The client in the cell phone can then facilitate communications with the altitude and/or context detection functionalities of the present invention. Many more implementations are possible, as will become apparent to those skilled in the art.

In one example, the system can provide the client with an estimated Altitude above Mean Sea Level based on the user's current position. For example, the system can either locally (i.e. at the client) or remotely (i.e. at the server) store a terrain database which will provide a coarse altitude estimate based on the approximate latitude/longitude of the device. This coarse altitude will be used as a seed for setting the approximate altitude of the device.

In another example, the system can provide weather pattern updates to supplement the altitude measurements using a pressure sensor. For example, the client/server communications can be used to bring in real time/near real time as well as historical pressure map for the area the user is currently in. This data can be use to provide the differential correction to pressure sensor during extreme weather changes in the region, e.g. High Pressure or Low Pressure gradients during a storm In addition to this, using 3D map and POI data, one will be able to predict whether a user is in a pressurized building and hence correct for anomalies observed in such an environment.

The approaches described herein can be used in any type of PND, including those also used in vehicles, as well as cell phones, iPhones, PDAs, wrist watches or pendants with GPS functionality, handheld or laptop computers, and other type of device with built-in GPS functionality. Therefore, the configuration of the functions and the equipment can vary from implementation to implementation depending upon numerous factors, such as price constraints, performance requirements, technological improvements, or other circumstances.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   receiving data corresponding to a user's position in altitude;
   filtering samples, to remove noise and smooth, of the user's altitude data with at least two different order filters each in a time window of respectively different durations to obtain different numbers of filtered samples of the same altitude data corresponding to the two filters;
   automatically determining the user's context based on the filtered samples of the received altitude data, the context including whether the user's altitude is changing, and if it is changing, a type of motion associated with the changing altitude.

2. A method according to claim 1, wherein the type of motion includes one of moving at the same altitude, moving on a ramp, stair or escalator, and riding an elevator.

3. A method according to claim 1, wherein the receiving step includes obtaining samples of data from a pressure sensor.

4. A method according to claim 3, wherein the step of receiving data further includes receiving additional information from an external source, and using the additional information to adjust the pressure sensor data.

5. A method according to claim 4, wherein the additional information includes approximate altitude based on the user's location.

6. A method according to claim 4, wherein the additional information includes atmospheric conditions based on the user's location.

7. A method according to claim 4, wherein the additional information includes indoor pressure conditions based on the user's location.

8. A method according to claim 4, further comprising:
   calibrating the pressure sensor using the additional information.

9. A method according to claim 3, further comprising:
   receiving satellite positioning information, and
   determining a navigation solution for the user using the received satellite positioning information and the altitude information, the navigation solution including estimated altitude.

10. A method according to claim 9, wherein the step of determining the navigation solution includes supplying the altitude information from the pressure sensor to a Kalman filter.

11. A method according to claim 1, wherein the different numbers of filtered samples of altitude data from the different time windows are compared against a threshold value to determine the type of motion associated with the changing altitude.

12. A method according to claim 11, wherein the automatically determining step further includes comparing the outputs of certain of the filters to determine that the person is moving on the same floor.

13. A method according to claim 11, wherein the automatically determining step further includes comparing the outputs of certain of the filters to determine that the person is moving on a ramp, staircase or escalator.

14. A method according to claim 11, wherein the automatically determining step further includes comparing the outputs of certain of the filters to determine that the person is moving on an elevator.

15. A method according to claim 11, further comprising comparing the outputs of certain of the filters to determine that altitude drift correction is needed.

16. A method according to claim 1, wherein the automatically determining step is further based on information about the user's acceleration.

17. A navigation device comprising:
   a radio frequency (RF) receiver adapted to provide position data;
   a barometric pressure sensor adapted to provide altitude data; and a processor communicatively coupled with the RF receiver and the barometric pressure sensor, the processor including at least two different order filters each adapted to filter, by removing noise and smoothing, the altitude data in a time window of respectively different duration to obtain different numbers of filtered samples of the same altitude data corresponding to the two filters, wherein the samples of altitude data determine whether a user's altitude is changing, as well as the rate at which the altitude is changing.

18. The navigation device of claim 17, wherein the processor is further configured to:
use the position data to determine the user's position while the RF receiver is providing reliable position data; and
use the altitude data from the pressure sensor to determine the user's altitude when the RF receiver has stopped providing reliable position data.

19. The navigation device of claim 17, wherein the processor is further configured to determine a type of motion associated with the rate at which the user's altitude is changing.

20. The navigation device of claim 19, wherein the different numbers of samples of altitude data from the different time windows are compared against a threshold value to determine the type of motion associated with the rate at which the user's altitude is changing.

21. The navigation device of claim 20, wherein the processor compares outputs of the filters to determine that the user is moving on a same floor.

22. The navigation device of claim 20, wherein the processor compares outputs of the filters to determine that the user is moving on a ramp, staircase or escalator.

23. The navigation device of claim 20, wherein the processor compares outputs of the filters to determine that the user is moving on an elevator.

24. The navigation device of claim 20, wherein the processor compares outputs of the filters to determine that altitude drift correction is needed.

* * * * *

UNITED STATES PATENT AND TRADEMARK OFFICE
CERTIFICATE OF CORRECTION

PATENT NO. : 8,566,032 B2
APPLICATION NO. : 12/609582
DATED : October 22, 2013
INVENTOR(S) : Chowdhary et al.

Page 1 of 2

It is certified that error appears in the above-identified patent and that said Letters Patent is hereby corrected as shown below:

On the Title Page, in Item (75), under "Inventors", in Column 1, Lines 4-5, delete "Rajastrian (IN);" and insert -- Rajasthan (IN); --, therefor.

On the Title Page, in Item (75), under "Inventors", in Column 1, Line 5, delete "Gwaziabad (IN);" and insert -- Ghaziabad (IN); --, therefor.

On the Title Page, in the Figure, delete " 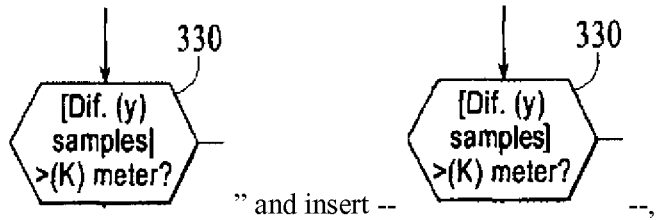 " and insert -- --, therefor.

On the Title Page, in the Figure, delete "  " and insert -- --, therefor.

In the Drawings:

In Fig. 3, Sheet 3 of 4, delete " 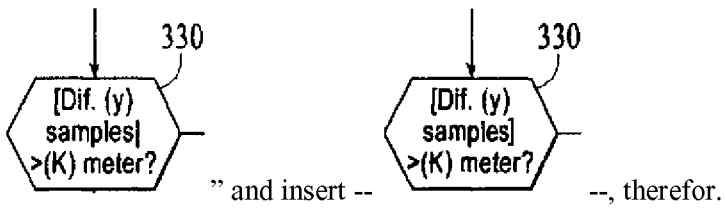 " and insert -- --, therefor.

Signed and Sealed this
Thirteenth Day of May, 2014

Michelle K. Lee
*Deputy Director of the United States Patent and Trademark Office*

CERTIFICATE OF CORRECTION (continued)

U.S. Pat. No. 8,566,032 B2

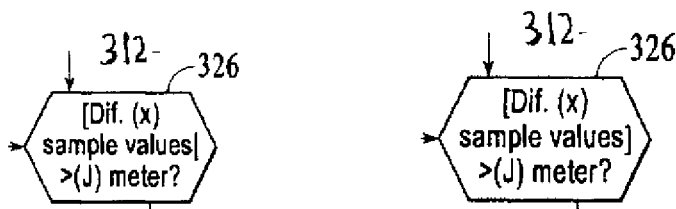

In Fig. 3, Sheet 3 of 4, delete " " and insert -- -- , therefor.

In the Specification:

In Column 3, Line 61, delete "Gamin," and insert -- Garmin, --, therefor.

In the Claims:

In Column 12, Line 31, in Claim 9, delete "information," and insert -- information; --, therefor.